US012560417B2

(12) United States Patent
Yow

(10) Patent No.: US 12,560,417 B2
(45) Date of Patent: Feb. 24, 2026

(54) BALLISTIC TEST BARRELS AND RELATED SYSTEMS AND METHODS

(71) Applicant: Corvid Technologies LLC, Mooresville, NC (US)

(72) Inventor: Caleb Yow, Mooresville, NC (US)

(73) Assignee: Corvid Technologies LLC, Mooresville, NC (US)

( * ) Notice: Subject to any disclaimer, the term of this patent is extended or adjusted under 35 U.S.C. 154(b) by 339 days.

(21) Appl. No.: 18/348,626

(22) Filed: Jul. 7, 2023

(65) Prior Publication Data

US 2025/0012551 A1     Jan. 9, 2025

(51) Int. Cl.
| | |
|---|---|
| *F42B 35/00* | (2006.01) |
| *F41A 31/00* | (2006.01) |
| *F41A 31/02* | (2006.01) |
| *G01D 11/26* | (2006.01) |
| *G01L 19/00* | (2006.01) |
| *G01N 21/84* | (2006.01) |

(52) U.S. Cl.
CPC .............. *F42B 35/00* (2013.01); *F41A 31/00* (2013.01); *F41A 31/02* (2013.01); *G01D 11/26* (2013.01); *G01L 2019/0053* (2013.01); *G01N 21/84* (2013.01)

(58) Field of Classification Search
CPC .......... F41A 31/00; F41A 31/02; F41A 99/00; F42B 35/00; G01D 11/26; G01N 21/84; G01N 21/8851; G01N 2021/0106; G01J 1/0407; G01J 3/0205; G01J 5/0875; G01M 11/00
See application file for complete search history.

(56) References Cited

U.S. PATENT DOCUMENTS

| | | | | |
|---|---|---|---|---|
| 3,854,331 | A | * | 12/1974 | Bateman, Jr. ........... F42B 35/00 73/167 |
| 4,147,055 | A | * | 4/1979 | Wood ..................... G01D 5/342 73/167 |
| 4,283,989 | A | * | 8/1981 | Toulios ................... G01S 13/58 342/60 |
| 4,677,376 | A | * | 6/1987 | Ettel ....................... G01P 3/665 324/179 |
| 5,151,555 | A | | 9/1992 | Vatsvog |
| 5,259,288 | A | | 11/1993 | Vatsvog |
| 5,421,264 | A | * | 6/1995 | Petrick ...................... F42B 5/08 102/443 |
| 8,807,039 | B2 | | 8/2014 | Carpenter et al. |
| 9,267,772 | B2 | | 2/2016 | Carpenter et al. |
| 9,513,097 | B1 | * | 12/2016 | Sheridan ............. G01B 5/0023 |
| 9,600,900 | B2 | * | 3/2017 | Sullivan .................. G06T 7/215 |
| D882,033 | S | | 4/2020 | Burrow et al. |
| D891,569 | S | | 7/2020 | Burrow et al. |
| 10,704,872 | B1 | | 7/2020 | Burrow et al. |
| 10,704,877 | B2 | | 7/2020 | Boss et al. |
| 10,760,882 | B1 | | 9/2020 | Burrow |
| 2003/0131751 | A1 | | 7/2003 | Mackerell et al. |
| 2016/0003585 | A1 | | 1/2016 | Carpenter et al. |
| 2016/0209155 | A1 | * | 7/2016 | Dodson ................... F41A 21/12 |
| 2022/0011078 | A1 | | 1/2022 | Padgett et al. |

FOREIGN PATENT DOCUMENTS

WO          2007014024 A2     2/2007

* cited by examiner

*Primary Examiner* — Benjamin R Schmitt
(74) *Attorney, Agent, or Firm* — Myers Bigel, P.A.

(57) ABSTRACT

A ballistic test barrel system includes a fixture, a chamber in the fixture, a barrel extending from the chamber, and an observation window in or on the chamber.

20 Claims, 10 Drawing Sheets

BALLISTIC TEST BARRELS AND RELATED SYSTEMS AND METHODS

STATEMENT OF GOVERNMENT SUPPORT

This invention was made with support under "Diagnostic Techniques for Caseless Ammunition Development" Contract No. W15QKN-21-C-0050, awarded by Army Contracting Command. The Government has certain rights in the invention.

BACKGROUND

Small caliber universal test barrels are widely used for determining the pressure vs. time developed inside the chamber of a rifle or pistol during the initiation and burning of the propellant, and these barrels typically have one or two pressure sensors located at the center of the chamber or near the mouth of the cartridge. Additionally, the test barrels are used for determining the muzzle velocity and accuracy of a given projectile, cartridge, and powder specification.

SUMMARY

Some embodiments of the present invention are directed to a ballistic test barrel system including: a fixture; a chamber in the fixture; a barrel extending from the chamber; and an observation window in or on the chamber.

In some embodiments, the observation window includes crystalline aluminum oxide.

In some embodiments, the observation window is transmissive to visible light.

In some embodiments, the observation window is transmissive to infrared radiation.

In some embodiments, the fixture includes a base and a clamp connected to the base.

In some embodiments, the clamp includes a viewing port that is aligned with the observation window.

In some embodiments, the barrel is releasably connected to the chamber.

In some embodiments, the barrel is configured to threadingly engage the chamber.

In some embodiments, the system includes a plurality of barrels each configured to selectively connected to the chamber, wherein different ones of the plurality of barrels comprise different barrel lengths and/or different bore diameters.

In some embodiments, the system includes a cartridge configured to be received in the chamber, wherein the cartridge comprises a transparent housing.

In some embodiments, the system includes a plurality of cartridges, wherein each of the plurality of cartridges includes a housing having substantially identical exterior dimensions, and wherein the housings of different ones of the plurality of cartridges have different interior volumes for varying powder load and/or different inner diameters for varying projectile caliber.

In some embodiments, the system includes a camera above the fixture and configured to capture optical and/or infrared images and/or video.

Some other embodiments of the present invention are directed to a method for observation of interior ballistics phenomena. The method includes providing a ballistic test barrel system including: a fixture; a chamber in the fixture; a barrel extending from the chamber; and an observation window in or on the chamber. The method includes: inserting a cartridge including a transparent housing into the chamber; firing the ballistic test barrel system including igniting propellant in the cartridge; and capturing an image or video of the propellant and/or a projectile held in the cartridge through the observation window.

Some other embodiments of the present invention are directed to a ballistic test barrel system including: a fixture; a chamber in the fixture; and a barrel that is releasably connectable to the chamber.

In some embodiments, the barrel is configured to threadingly engage the chamber.

In some embodiments, the barrel includes a plurality of barrels each configured to threadingly engage the chamber, wherein different ones of the plurality of barrels have different barrel lengths and/or different bore diameters.

In some embodiments, the system includes a plurality of cartridges, each cartridge having substantially the same exterior dimensions and configured to be received in the chamber, wherein different ones of the plurality of cartridges have different interior powder volumes and/or different inner diameters at a mouth of the cartridge.

In some embodiments, the plurality of cartridges include at least one cartridge having a first inner diameter and at least one cartridge having a second inner diameter, and wherein the plurality of barrels include at least one barrel having a first bore diameter corresponding to the first inner diameter and at least one barrel having a second bore diameter corresponding to the second inner diameter.

Further features, advantages and details of the present invention will be appreciated by those of ordinary skill in the art from a reading of the figures and the detailed description of the embodiments that follow, such description being merely illustrative of the present invention.

DETAILED DESCRIPTION

Commercially available test barrels can capture the pressure and velocity information of a cartridge very repeatably, but the initial burn progression through the powder bed and initial dynamic motion of the projectile are not captured with these devices.

In some embodiments of the present invention, the addition of an optical and/or infrared transmissive viewing window in conjunction with clear cartridges allows direct measurement of the temperature gradients within the chamber. The primer flash and projectile "jump" can also be directly observed. The observations can be used to validate computer models of such events that previously could only rely on pressure and velocity data for validation as well as qualitative assessments of the burn process that have previously been unattainable through direct methods.

Commercially available test barrels are typically constructed from either a single billet or two components press-fit together. For the two-part construction, the chamber section has a larger outer diameter and a hollow inner diameter. The hollow inner diameter mates with the outer diameter of the barrel through an interference press-fit, forming a single operational unit. The assembly is then held in a universal fixture for firing. Barrels of a variety of calibers, cartridge dimensions, and barrel lengths can be fit in the same test fixture, but each operational unit is unique to a given cartridge and barrel length.

In some embodiments of the present invention, the barrel is threaded and detachable from the cartridge. In conjunction with the cartridges described herein, this allows for variations in caliber and barrel length to be made without necessitating changes to the chamber, reducing the number of parts and cost associated with testing multiple types of projectiles and barrel lengths. This also reduces the cost associated with replacing a worn barrel through repeated use or overpressure.

Figure 1:
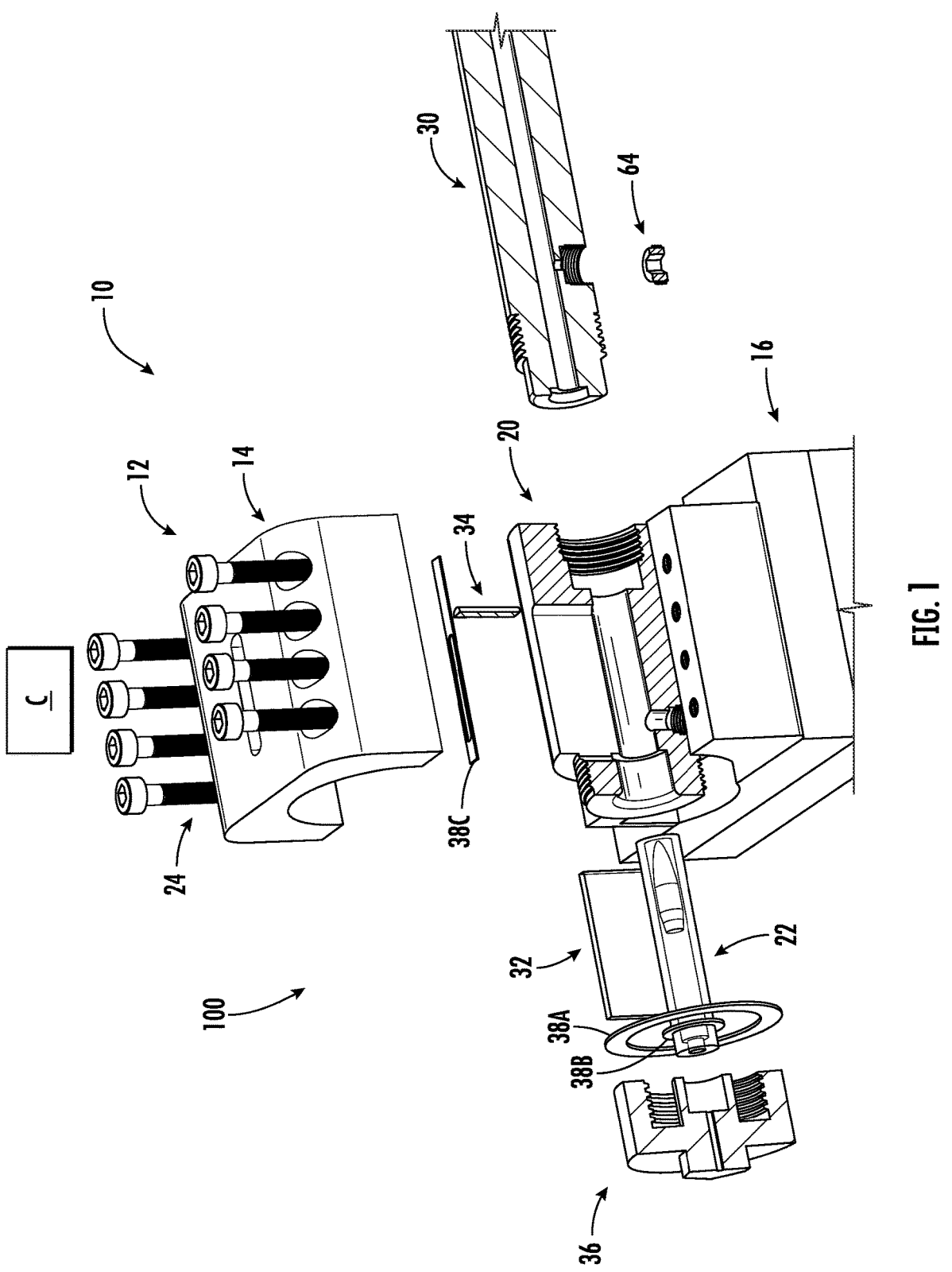
FIG. 1 is an exploded perspective view of a test barrel system according to some embodiments of the present invention.

FIG. 1 is an exploded view of a test barrel system 10 according to some embodiments. The system 10 includes a fixture 12 including a top clamp 14 and a stationary base 16.

A chamber 20 is in the fixture 12 and is configured to house a cartridge 22. The chamber 20 and the cartridge 22 will be described in more detail below.

Retaining bolts 24 may be received through the top clamp 14 and into the base 16 to connect the two components and form the fixture 12.

Figure 2:
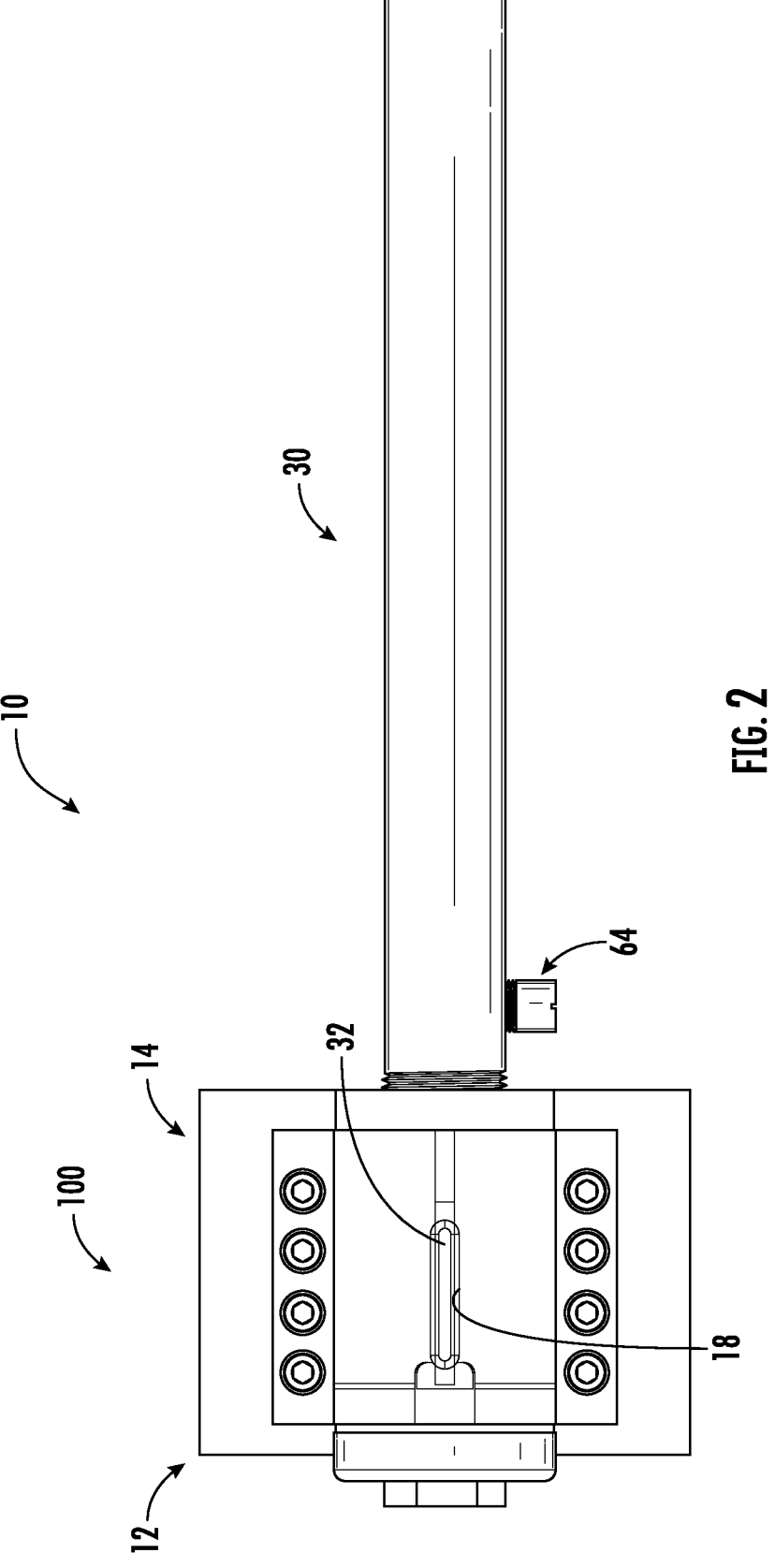
FIG. 2 is an assembled top view of the test barrel system of FIG. 1.

Referring to FIG. 2, in an assembled state, a barrel 30 extends away from the fixture 12 and/or the chamber 20. As described in more detail herein, the chamber 20 and the barrel 30 may be threaded such that the barrel 30 can be attached to and detached from the chamber 20.

Referring to FIGS. 1 and 2, an observation window 32 is in or on the chamber 20. As described in more detail herein, the window 32 may be transmissive to visible light and/or transmissive to infrared radiation to facilitate observation of interior ballistics phenomena.

In some embodiments, a window support pin 34 is used to support the window 32. As described in more detail below, the window 32 and the window support pin 34 may be held in a slot in the chamber 20.

The system 10 includes a breech cap 36 for enclosing chamber 20 (e.g., after the cartridge 22 has been inserted therein). The chamber 20 and the breech cap 36 may be threaded such that the breech cap 36 can be attached to and detached from the chamber 20.

One or more washers may be used for compliant mating surfaces. For example, first and second washers 38A and 38B may be positioned between the chamber 20 and the breech cap 36 and a third washer 38C may be positioned between top clamp 14 and the chamber 20. In some embodiments, the third washer 38C is elongated and includes an opening that aligns with the window 32. In some embodiments, the washers are formed of brass.

Figure 3:
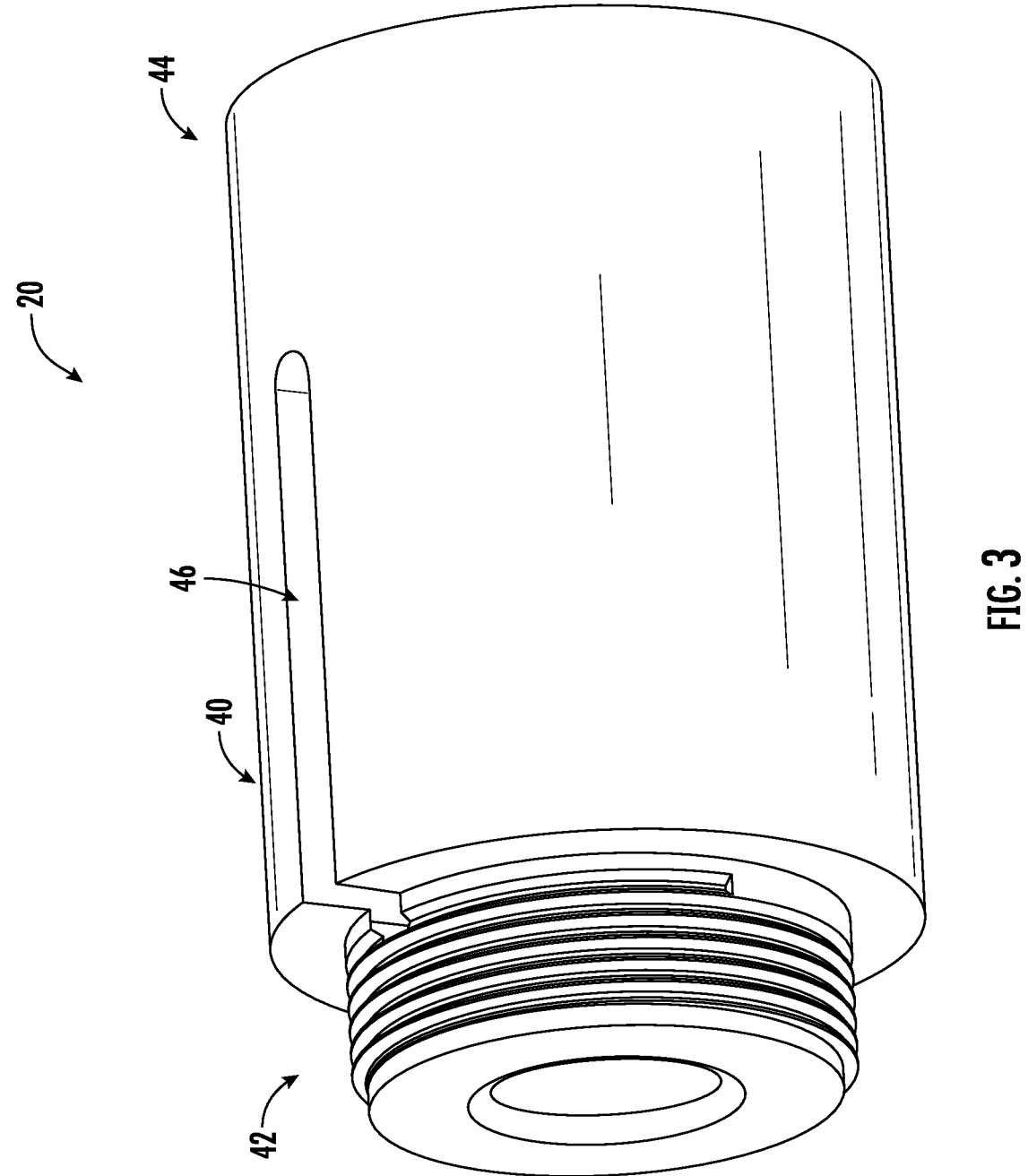
FIG. 3 is a perspective view of a chamber of the test barrel system of FIG. 1.
Figure 4:
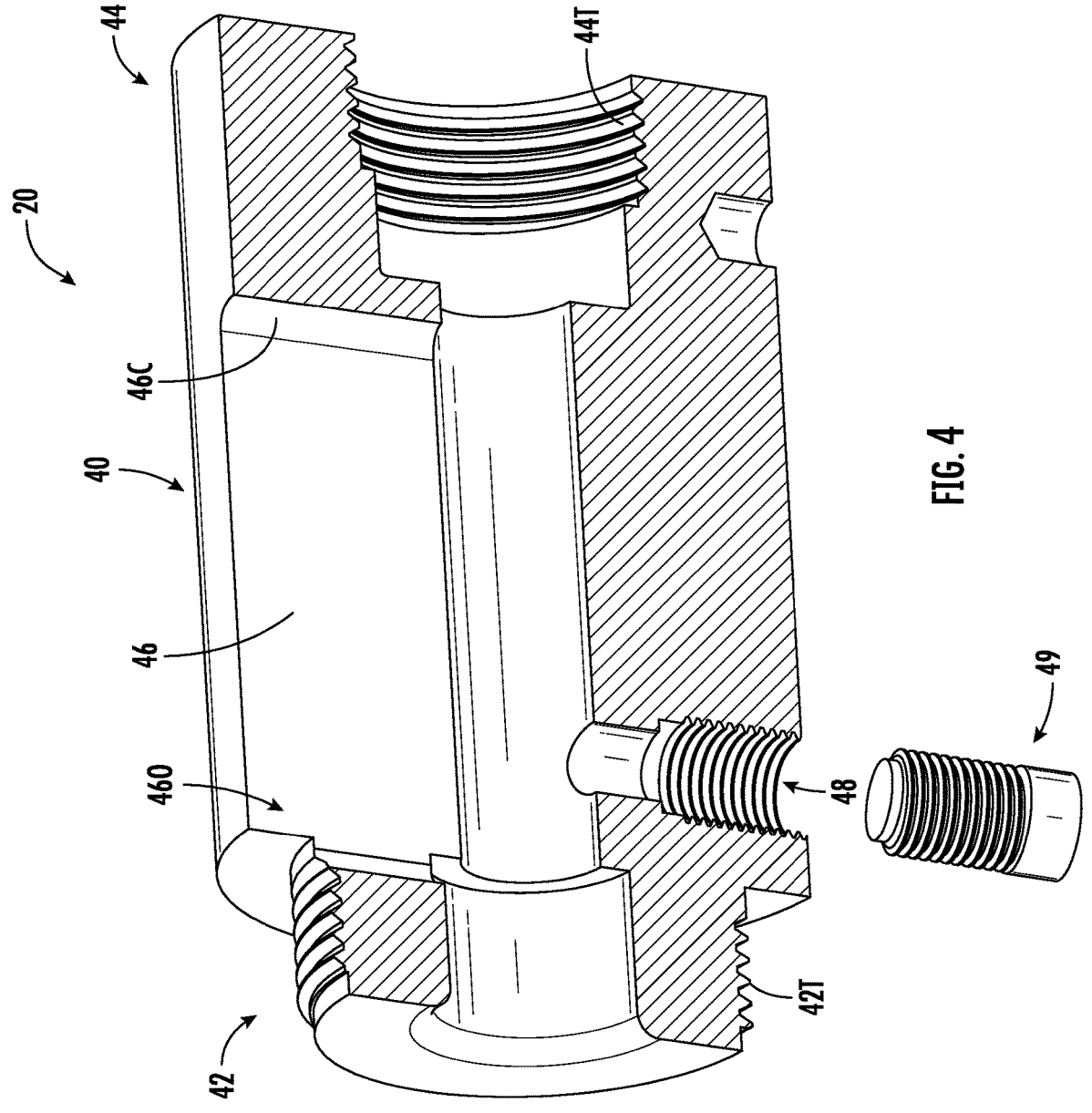
FIG. 4 is a sectional view of the chamber of FIG. 3.

The chamber 20 is shown in greater detail in FIGS. 3 and 4. The chamber 20 includes a body 40 including a first end portion 42 and an opposite second end portion 44. The first end portion 42 may be threaded and configured to threadingly engage the breech cap 36 (FIG. 1). The second end portion 44 may be threaded and configured to threadingly engage the barrel 30 (FIG. 1). Thus, the chamber 20 may including first and second threaded portions 42T, 44T each including threads.

A slot 46 may be defined in the body 40 of the chamber 20. In some embodiments, the slot 46 includes a partially open first end 460 and an arcuate or rounded second end 46C. The arcuate end 46C may have a semi-circular profile.

Figure 5:
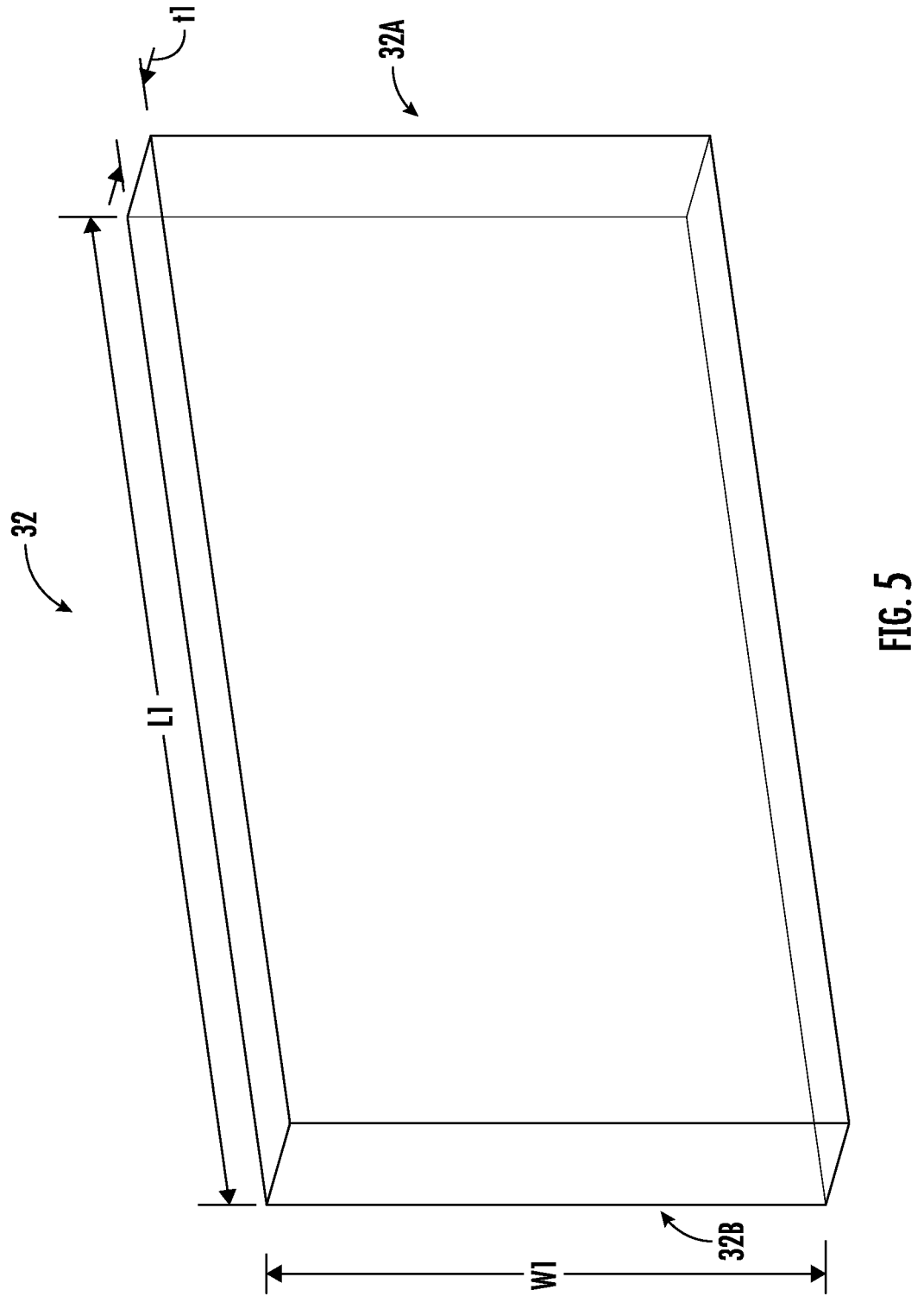
FIG. 5 is a perspective view of an observation window of the test barrel system of FIG. 1.

The observation window 32 according to some embodiments is shown in FIG. 5. The window may be rectangular. The window 32 may have a length L1, a width or height W1, and a thickness t1. The length L1 may be between 25 and 75 mm and, in some embodiments, may be about 45 mm. The width W1 may be between 10 and 30 mm, and in some embodiments, may be about 21 mm. The thickness t1 may be between 2 and 10 mm and, in some embodiments, may be about 5 mm.

As described herein, the window 32 may be transmissive to visible light and/or transmissive to infrared radiation to allow for high-speed video recording of the dynamics within the cartridge during firing. In some embodiments, the window 32 is a sapphire window. As used herein, the term "sapphire window" means that the window is formed of or includes natural sapphire or synthetic sapphire (e.g., lab grown single crystalline aluminum oxide). Sapphire or crystalline aluminum oxide may be chosen due to its high strength and transmissivity to visible light and infrared radiation. Other suitable materials may be used for the window; one example is diamond.

Figure 6:
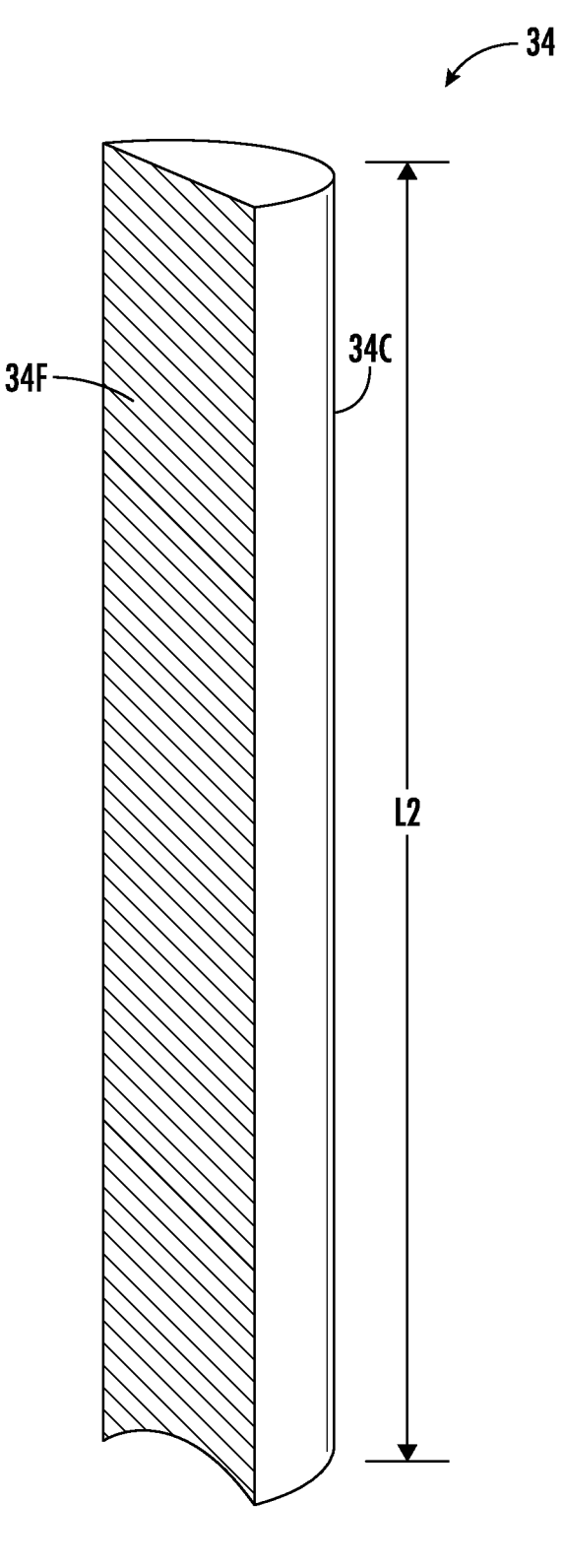
FIG. 6 is a perspective view of a window support pin of the test barrel system of FIG. 1.

The window support pin 34 is shown in FIG. 6. The support pin 34 has a length L2 that may be substantially the same as the width or height W2 of the window 32 (FIG. 5). The support pin 34 includes a flat surface 34F and an arcuate or rounded surface 34C. The support pin 34 may have a semi-circular profile.

Referring to FIGS. 4-6, the window 32 and the window support pin 34 may be received in the slot 46 of the chamber 20. The arcuate surface 34C of the window support pin 34 may be received against the arcuate end 46C of the slot 46, a first end 32A of the window 32 may be received against the flat surface 34F of the window support pin 34, and an opposite second end 32B of the window may be received at the partially open end 460 of the slot 46. In some embodiments, the second end 32B of the window 32 may be received against the washers 38A and 38B (FIG. 1).

Other configurations are contemplated. For example, the first end 32A of the window may be rounded to fit within the rounded end 46C of the slot 46. In other embodiments, the rounded end 46C may instead be flat. In these cases, the window may be received in the slot and the window support pin may be omitted.

Referring to FIG. 4, the chamber 20 may include a pressure sensor pass-through 48 configured to receive a pressure sensor or pressure sensor adapter 49. A corresponding pressure sensor pass-through may be included in the base 16 (FIG. 1).

Referring again to FIG. 2, the top clamp 14 includes a viewing port 18 that is aligned with the observation window 32. This allows for images and video to be captured from above the fixture 12. In some embodiments, as shown in FIG. 1, the system 10 includes a camera C configured to be positioned above the fixture 12. The camera C may be configured to capture optical and/or infrared images and/or video.

Typical cartridge pressures are in excess of 60,000 psi, and the use of sapphire or crystalline aluminum oxide with the clamping approach described herein should be capable of exceeding 100,000 psi. The addition of a viewing window is not a trivial task at these pressures. In order for the sapphire or crystalline aluminum oxide to withstand these pressures, the tolerances on the chamber cutout (i.e., the slot 46 shown in FIGS. 3 and 4) must be very tight such that the sapphire window is not free to expand in any lateral direction when subjected to high pressures.

Figure 7:
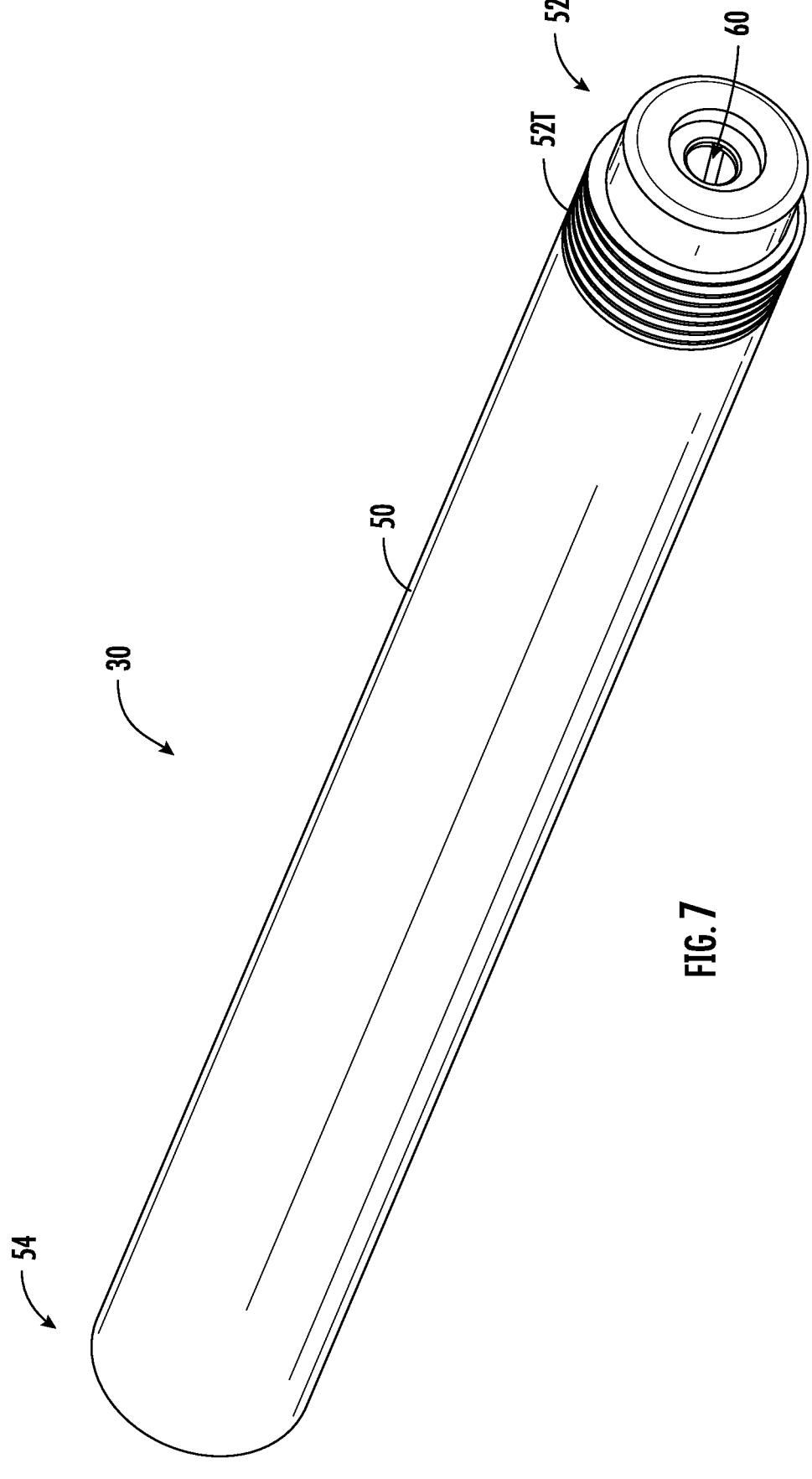
FIG. 7 is a perspective view of a barrel of the test barrel system of FIG. 1.
Figure 8:
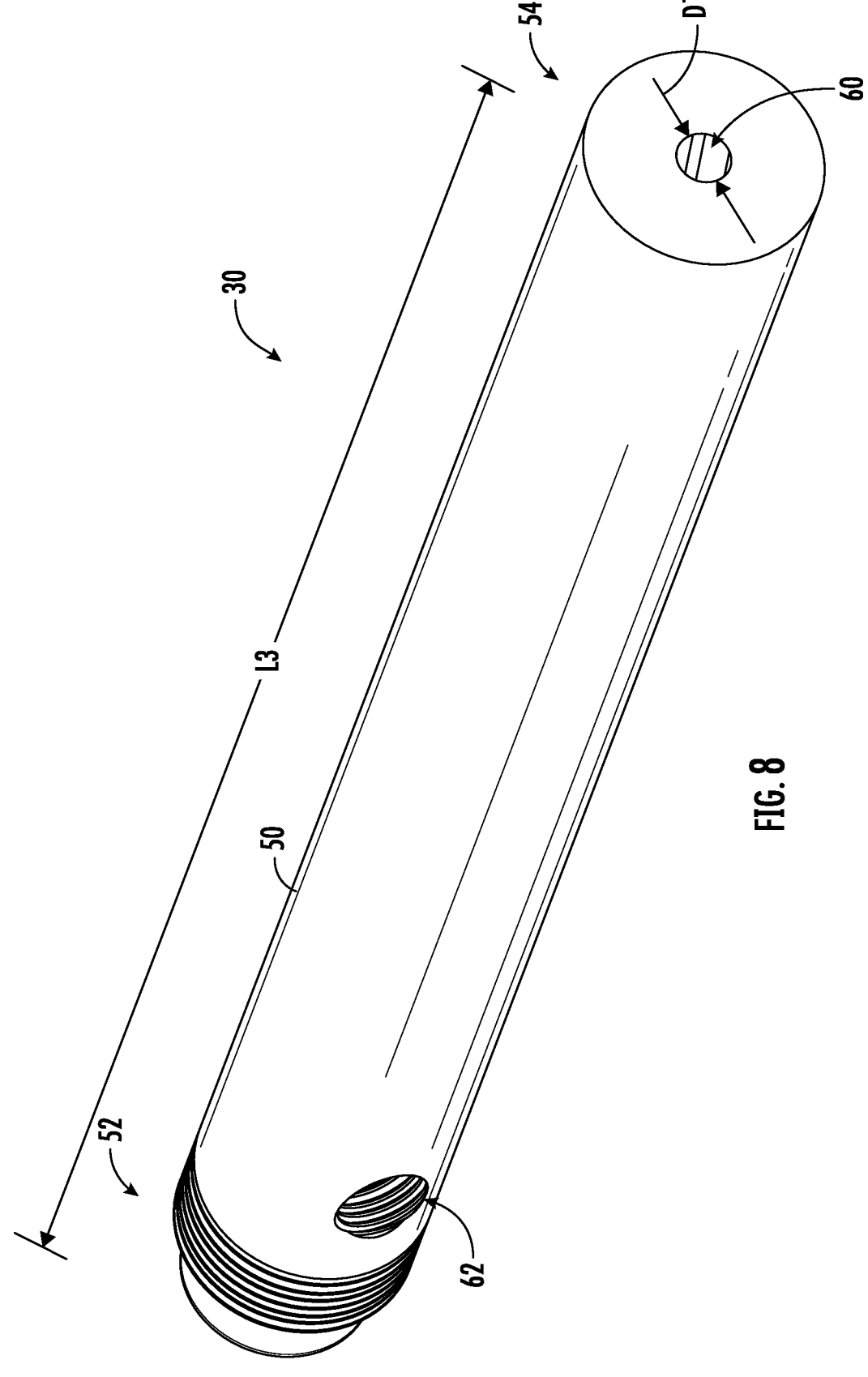
FIG. 8 is another perspective view of the barrel of FIG. 7.

The barrel 30 is shown in greater detail in FIGS. 7 and 8. The barrel 30 includes a body 50 including a first end portion 52 and an opposite second end portion 54. The first end portion 52 may be threaded to and configured to threadingly engage the chamber 20 (FIG. 4). More specifically, the second end portion 54 of the barrel 30 may be threaded and configured to threadingly engage the second end portion 44 of the chamber 20 (FIG. 4). Thus, the barrel 30 may include a threaded portion 54T including threads.

The barrel 30 includes a bore 60 that extends from the first end portion 52 (or the bore entry) to the second end portion 54 (or the bore exit).

The barrel may include a pressure sensor pass-through 62 configured to receive a pressure sensor or pressure sensor adapter such as the pressure sensor adapter 64 shown in FIG. 1. The pressure sensor pass-through 62 is in communication with the bore 60 and may be at or adjacent the first end portion 52.

The barrel has a length L3. The bore has a diameter D1.

In conjunction with the cylindrical cartridges described below, the detachable, threaded barrel 30 allows for variations in caliber and barrel length to be made without necessitating changes to the chamber 20, reducing the cost associated with testing multiple types of projectiles and barrel lengths. This also reduces the cost associated with replacing a worn barrel through repeated use or overpressure.

Some embodiments of the present invention are directed to kits or systems including a chamber assembly 100 and a plurality of the barrels 30. The chamber assembly 100 may include at least some the components described with reference to FIG. 1 with the exception of the detachable barrel 30. The plurality of barrels 30 may include barrels having different lengths L3 and/or bore diameters D1 to provide variations in barrel length and/or caliber.

Figure 9:
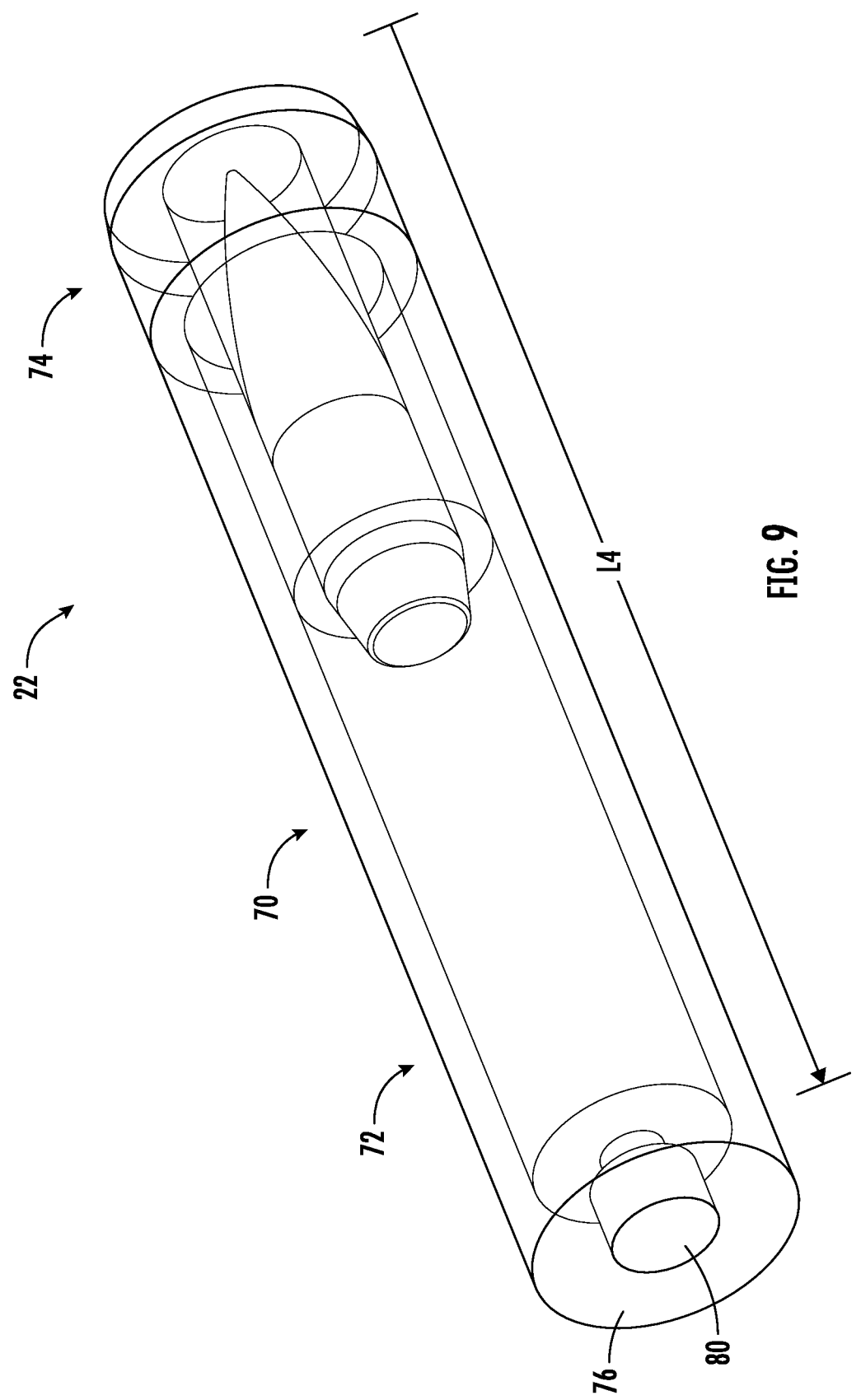
FIG. 9 is a perspective view of a cartridge of the test barrel system of FIG. 1.
Figure 10:
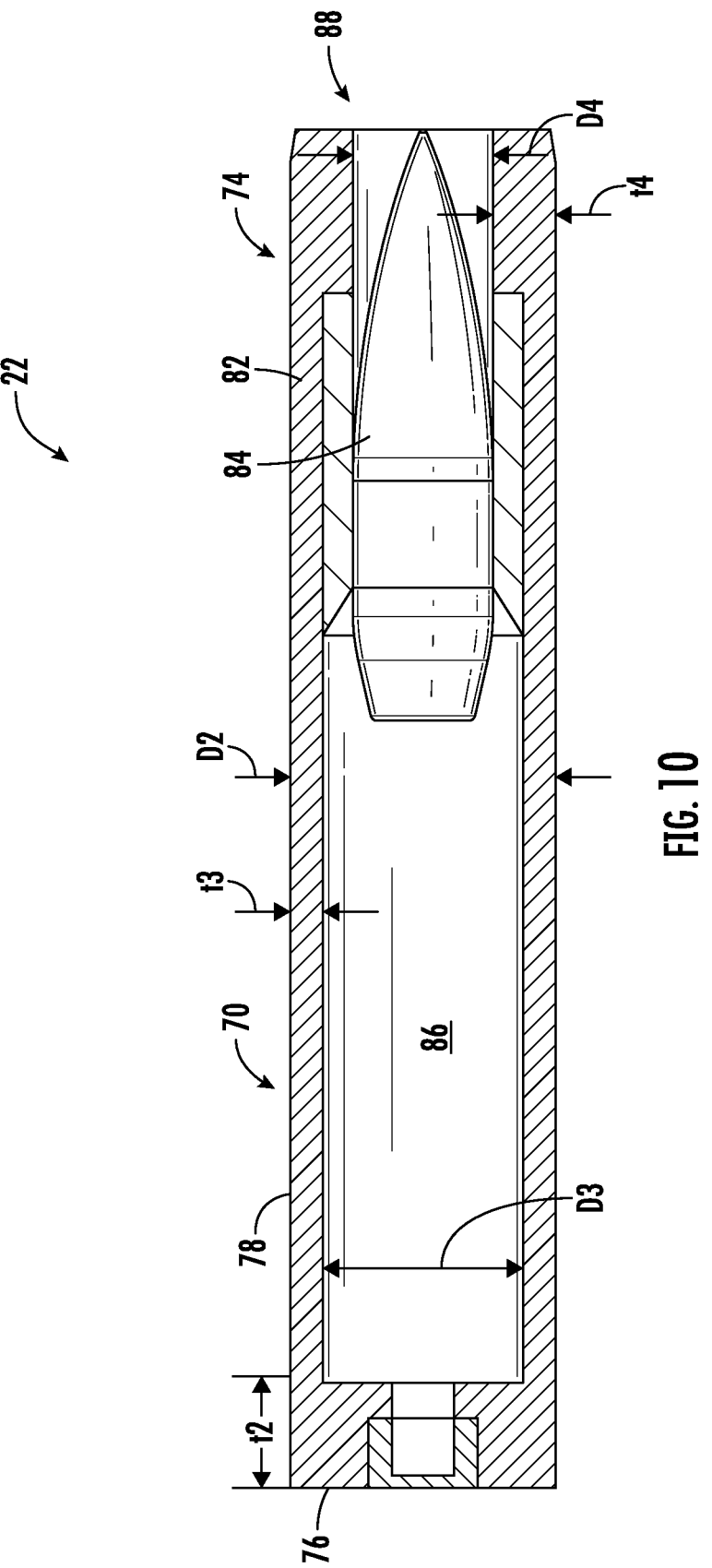
FIG. 10 is a sectional view of the cartridge of FIG. 9.

The cartridge 22 is illustrated in greater detail in FIGS. 9 and 10. The cartridge 22 includes a housing 70. The housing has an outer diameter D2 and a length LA.

In some embodiments, the housing 70 includes a body 72 and a head 74 connected to the body 72. In some other embodiments, the housing 70 is single-piece or monolithic. In such cases, the housing includes a body portion 72 and a head portion 74 (referred to as body and head herein for convenience of explanation).

The body 72 includes an end wall 76 and a sidewall 78. A primer case 80 may be held in the end wall 76. The body 72 has an inner diameter D3.

The head 74 includes a sidewall 82. The head 74 has an inner diameter D4 (e.g., at a mouth 88 of the cartridge 22). In some embodiments, the inner diameter D4 of the head 74 is smaller than the inner diameter D3 of the body 72. A projectile 84 may be held in the head 74.

The body 72 has an inner space or volume 86 defined by the end wall 76 and the sidewall 78. Propellant or powder is held in the inner space 86.

Powder load can be adjusted by adjusting the volume of the inner space 86. For example, a thickness t2 of the end wall 76 and/or a thickness t3 of the sidewall 78 can be adjusted to adjust the powder load. This can be accomplished without altering the outer dimensions of the cartridge 22.

Further, the caliber of the projectile 84 can be adjusted by adjusting the inner diameter D4 of the head. For example, a thickness t4 of the sidewall 82 can be adjusted to adjust the caliber. This can also be accomplished without altering the outer dimensions of the cartridge 22.

The housing 70 may be polymeric. In some embodiments, the housing 70 is formed of a polycarbonate plastic.

In order to view the propellant burn process through the sapphire or crystalline aluminum oxide window, the cartridge must also be transparent (or transmissive to visible light). For infrared observation, the cartridge must also be transparent to MWIR.

The polymeric cartridges described herein allow for different calibers of projectiles and different interior powder volumes without requiring changes to the external dimensions of the cartridge. This allows all of the test barrel components except for the threaded barrel (FIGS. 7 and 8) and the cartridge to be used for alternative calibers and/or powder loads as well as changes to the barrel length. Traditionally produced brass cartridges cannot be made universal in this way (except for changes in length).

Commercially available universal test barrels have the chamber and barrel as one piece (or permanently press-fit assembly) and can be changed as a unit for various calibers. However, this incurs greater expense on account of larger components having to be created and changed out. Commercially available universal test barrels also must be fitted with cartridges specific to the chamber geometry. Changes to the powder load can be made, but this introduces excessive ullage (the free space within a cartridge). By varying the internal dimensions of the cartridges described herein, the ullage can be controlled largely independently of the powder load, and the caliber of the projectile can also be changed, necessitating only changes to the internal dimensions of the threaded barrel and the cartridge head.

Some embodiments of the present invention are directed to kits or systems including a plurality of the cartridges as described herein, with different ones of the cartridges having different internal geometry but all having the same external geometry (e.g., to properly fit within the chamber). Some embodiments of the kits include a plurality of the barrels as described herein, with different ones of the barrels having different bore diameters to match corresponding ones of the cartridges configured to hold projectiles of different calibers.

The present invention has been described herein with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items. When the term "about" or "substantially" is used in the specification the intended meaning is that the value is plus or minus 10% of the specified value.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth herein.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The foregoing is illustrative of the present invention and is not to be construed as limiting thereof. Although a few example embodiments of this invention have been described, those skilled in the art will readily appreciate that many modifications are possible in the example embodiments without materially departing from the teachings and advantages of this invention. Accordingly, all such modifications are intended to be included within the scope of this invention as defined in the claims. The invention is defined by the following claims, with equivalents of the claims to be included therein.

What is claimed is:

1. A ballistic test barrel system comprising:
   a fixture;

a chamber in the fixture;
a barrel extending from the chamber; and
an observation window in or on the chamber,
wherein the observation window comprises crystalline aluminum oxide.

2. The system of claim 1 wherein the observation window is transmissive to visible light.

3. The system of claim 1 wherein the observation window is transmissive to infrared radiation.

4. The system of claim 1 wherein the fixture comprises a base and a clamp connected to the base.

5. The system of claim 4 wherein the clamp comprises a viewing port that is aligned with the observation window.

6. The system of claim 1 wherein the barrel is releasably connected to the chamber.

7. The system of claim 6 wherein the barrel is configured to threadingly engage the chamber.

8. The system of claim 6 comprising a plurality of barrels each configured to be selectively connected to the chamber, wherein different ones of the plurality of barrels comprise different barrel lengths and/or different bore diameters.

9. The system of claim 1 further comprising a cartridge configured to be received in the chamber, wherein the cartridge comprises a transparent housing.

10. The system of claim 1 further comprising a plurality of cartridges, wherein each of the plurality of cartridges comprises a housing having substantially identical exterior dimensions, and wherein the housings of different ones of the plurality of cartridges have different interior volumes for varying powder load and/or different inner diameters for varying projectile caliber.

11. The system of claim 1 further comprising a camera above the fixture and configured to capture optical and/or infrared images and/or video.

12. A method for observation of interior ballistics phenomena, the method comprising:
   providing a ballistic test barrel system comprising:
      a fixture;
      a chamber in the fixture;
      a barrel extending from the chamber; and
      an observation window in or on the chamber, wherein the observation window comprises crystalline aluminum oxide;
   inserting a cartridge comprising a transparent housing into the chamber;
   firing the ballistic test barrel system including igniting propellant in the cartridge; and
   capturing an image or video of the propellant and/or a projectile held in the cartridge through the observation window.

13. A ballistic test barrel system comprising:
   a fixture comprising a base and a clamp connected to the base;
   a chamber in the fixture;
   a barrel that is releasably connectable to the chamber; and
   an observation window in or on the chamber,
   wherein the clamp comprises a viewing port that is aligned with the observation window.

14. The system of claim 13 wherein the barrel is configured to threadingly engage the chamber.

15. The system of claim 14 wherein the barrel comprises a plurality of barrels each configured to threadingly engage the chamber, wherein different ones of the plurality of barrels have different barrel lengths and/or different bore diameters.

16. The system of claim 15 further comprising a plurality of cartridges, each cartridge having substantially the same exterior dimensions and configured to be received in the chamber, wherein different ones of the plurality of cartridges have different interior powder volumes and/or different inner diameters at a mouth of the cartridge.

17. The system of claim 16 wherein the plurality of cartridges comprise at least one cartridge having a first inner diameter and at least one cartridge having a second inner diameter, and wherein the plurality of barrels comprise at least one barrel having a first bore diameter corresponding to the first inner diameter and at least one barrel having a second bore diameter corresponding to the second inner diameter.

18. The system of claim 13 wherein the observation window comprises crystalline aluminum oxide.

19. The system of claim 13 wherein the observation window is transmissive to visible light.

20. The system of claim 13 wherein the observation window is transmissive to infrared radiation.

\* \* \* \* \*